United States Patent [19]
Mansour et al.

[11] Patent Number: 5,601,748
[45] Date of Patent: Feb. 11, 1997

[54] METHOD OF MAKING FERROELECTRIC-FERROMAGNETIC COMPOSITE MATERIALS

[75] Inventors: Said A. Mansour, West Lafayette, Ind.; Adolph L. Micheli, Harrison Township, Macomb County, Mich.; Joseph V. Mantese, Troy, Mich.; Dennis F. Dungan, Clintown Township, Macomb County, Mich.

[73] Assignee: General Motors Corporation, Detroit, Mich.

[21] Appl. No.: 626,088

[22] Filed: Apr. 1, 1996

[51] Int. Cl.[6] .......................... C04B 35/26; C04B 35/465; C04B 35/468; C04B 35/47
[52] U.S. Cl. .................... 252/62.9 R; 252/62.6; 501/135; 501/136; 501/137
[58] Field of Search ............................ 252/62.9 R, 62.6; 501/135, 136, 137

[56] References Cited

U.S. PATENT DOCUMENTS

4,082,906  4/1978  Amin et al. .............................. 428/539
5,512,196  4/1996  Mantese et al. ...................... 252/62.9 R

FOREIGN PATENT DOCUMENTS

WO92/00930  1/1992  WIPO.

OTHER PUBLICATIONS

Chem. Abstract 80:114058, Japanese patent 48-95596.
Bultitude et al, "Development of Low–Fire Environment Friendly Dielectric Compositions for Multilayer Capacitors," *Ceramic Transactions*, 32 (1992), pp. 177–190.

Haussonne et al, "Barium Titanate Perovskite Sintered with Lithium Fluoride," *Journal of the American Ceramic Society*, vol. 66, No. 11, Nov. 1983, pp. 801–807.

Tolino et al, "Effect of Ba:Ti Ratio on Densification of LiF–Fluxed $BaTiO_3$," *Communications of the American Ceramic Society*, vol. 68, No. 11, Nov. 1985, pp. C–292–C–294.

Walker, Jr. et al, "Densification and Strength of $BaTiO_3$ with LiF and MgO Additives," *Ceramic Bulletin*, vol. 55, No. 3 (1976), pp. 274–285.

Yang et al, "A New Sintering Agent for $BaTiO_3$: The Binary BaO—CuO System," *Journal of Materials Science Letters*, 11 (1992), pp. 1246–1248.

*Primary Examiner*—Melissa Bonner
*Attorney, Agent, or Firm*—George A. Grove

[57] ABSTRACT

Barium-strontium titanate ferroelectric materials and $AFe_2O_4$-type ferrite ferromagnetic materials may be consolidated into a ferroelectric-ferromagnetic composite having useful electromagnetic interference attenuation properties over a wide range of electromagnetic frequencies by fluxing the barium-strontium titanate with a combination of (1) a lithium compound and barium oxide or (2) copper oxide and barium oxide and thereafter mixing the fluxed ferroelectric with the ferromagnetic and sintering the combination at reduced temperature in the range of 1060° C. to 1150° C.

6 Claims, 1 Drawing Sheet

METHOD OF MAKING FERROELECTRIC-FERROMAGNETIC COMPOSITE MATERIALS

This invention pertains to a method of making composites of ferroelectric-ferromagnetic materials. Such composite materials are useful, e.g., for attenuation of electromagnetic radiation, especially at 100 Mhz and higher frequencies. More particularly, it pertains to a method by which such composites can be formed at reduced sintering temperatures.

BACKGROUND OF THE INVENTION

A family of ferroelectric-ferromagnetic composite materials are described in U.S. Ser. No. 08/265,899 filed Jun. 27, 1994, now U.S. Pat. No. 5,512,196 which disclosure in its entirety is incorporated herein by reference. Such composite materials are particularly useful in electronic filtering elements to suppress electromagnetic interference (EMI). The electromagnetic interference filters find particular application in an automotive environment where there is an abundance of stray radio frequency noise, interference between electrical devices, and noise created by the making and breaking of circuits, spark discharges, poor contact between metal bonds and components, and atmospheric interference. Such EMI sources in an automobile pose a serious threat to the electrical integrity of electrical circuitry and the function of electrical components.

Suitable ferroelectric materials for the subject ferroelectric-ferromagnetic composites include barium titanate, barium strontium titanate, barium strontium niobate and barium copper tantalate. Typically, barium titanate is the preferred ferroelectric material because it has a high permittivity ($\epsilon/\epsilon_0$) of about 1000 or higher at about 1 kHz. The ferromagnetic constituent of the composite is a ferrite which is a high electrical resistance magnetic material consisting principally of ferric oxide ($Fe_2O_3$) and one or more other oxides. Suitable ferromagnetic materials are certain of the $AB_2O_4$-type, ferromagnetic ferrites where A is at least one element selected from the group consisting of copper, magnesium, zinc, nickel and manganese and B is iron. A particularly preferred ferrite because of its electromagnetic properties and its relatively low sintering temperature is a copper-zinc-magnesium containing, $AB_2O_4$ type ferrite with excess A component. ($Cu_{0.2}Mg_{0.4}Zn_{0.5}Fe_2O_4$) is exemplary of such suitable copper-based ferrites. In general, both the ferroelectric constituent and ferromagnetic constituent are employed as very fine grained particles, suitably about one to five microns in diameter, and they are thoroughly mixed together and compacted and sintered to form a composite body in which grains of each material are percolated or interconnected with each other, i.e., each grain of ferroelectric has neighboring grains of ferromagnetic and vice versa. However, the grains of ferroelectric and ferromagnetic are not chemically reacted. The distinct phases of the ferroelectric and ferromagnetic granular constituents essentially retain their distinct properties.

For many electromagnetic filtering applications, it is preferred to employ approximately equal parts by volume of the ferroelectric fine grained constituent and the ferromagnetic fine grained constituent. When, e.g., barium titanate is employed in combination with the copper-zinc-magnesium ferrite, such an equal volume ratio mixture is compacted and sintered at a temperature of the order of 1185° C. Such a sintered composite provides excellent electromagnetic attenuation or filtering properties, especially at frequencies of 100 MHz to 1 GHz, as more fully described in the above-identified U.S. patent application. However, in many such filtering applications, it is desirable to form a device of multiple layers of the subject composite material with internal metallic electrodes positioned between the refractory oxide layers. High temperature firing, such as at 1185° C., limits the choice of electrode materials to expensive precious metal conductors such as a gold-platinum-palladium ternary alloy. It is desirable to retain the benefits of the composite sintered ferroelectric-ferromagnetic bodies while processing them by firing at a temperature of the order of 1100° C. so that the energy costs of sintering can be reduced and a lower cost electrode material can be employed. If the sintering temperature of the barium titanate/magnesium-copper-zinc ferrite composites (or of other family member composites) could be reduced to about 1100° C., then, e.g., a silver-palladium electrode material consisting of about 70% by weight silver and 30% by weight palladium could be employed at considerable cost savings.

SUMMARY OF THE INVENTION

The invention is a method by which the sintering temperature of suitable ferroelectric and ferromagnetic material combinations can be reduced so as to reduce the cost of an EMI attenuating device or structure employing the composite materials. The invention permits such reduction of sintering temperature without causing a chemical reaction between the fine grains of distinct materials forming the composite. In other words, the invention involves a compositional change in at least one of the ferroelectric and ferromagnetic materials, but the sintered composite still consists essentially of two distinct interconnected phases of these materials so that the properties of the composite are characteristic of the properties of the constituent starting materials.

The invention is applicable to ferroelectric materials selected from the group consisting of barium titanate ($BaTiO_3$), strontium titanate ($SrTiO_3$) and barium strontium titanates ($Ba_xSr_{1-x}TiO_3$). Suitable ferromagnetic constituents are $AFe_2O_4$-type ferrites where A is copper or copper with one or more of lithium, magnesium, manganese, nickel and zinc. In these combinations of ferroelectric and ferromagnetic materials, the ferroelectric is the material that has the higher melting and sintering temperatures. As disclosed in the above-referenced patent application, the ferromagnetic material is selected so as to provide suitable ferromagnetic properties and to reduce the sintering temperature of the composite as compared to the sintering temperature of the ferroelectric. However, the practice of this invention is to modify the composition of the ferroelectric material so as to reduce its sintering temperature and in suitable combination the sintering temperature of the composite material. This is accomplished without promoting chemical reaction or diffusion between the ferroelectric grains and ferromagnetic grains and without degrading the properties of the ferroelectric.

Two fluxing material combinations are suitable for use with the ferroelectric. They are suitable because they ultimately promote a lower sintering temperature of the ferroelectric-ferromagnetic composite without forming additional phases or otherwise degrading the EMI suppression properties of the composite.

The first combination consists of a suitable lithium compound paired with barium oxide or a precursor of barium oxide. For example, in a preferred embodiment, lithium fluoride and barium oxide are employed to flux barium titanate. However, other lithium compounds such as other lithium halide salts or lithium carbonate may be employed. The compound is selected such that the elements other than lithium are driven off at sintering temperatures. Barium carbonate or other barium oxide precursor (upon calcining) may be employed.

The second combination of fluxing agents is a mixture of barium oxide or a barium oxide precursor with copper oxide or copper oxide precursor. Copper nitrate or carbonate, for example, may be used in place of copper oxide because the nitrate or carbonate decomposes to the oxide upon heating.

The two groups of fluxing materials are used in suitable small amounts to modify the composition of the barium titanate so that its sintering temperature and that of the composite is reduced. In the case of the lithium compound barium oxide combination, one weight percent of lithium fluoride, for example, based on the weight of barium titanate, and about two mole percent of barium oxide based on the barium titanate are suitable fluxing quantities. In the case of the copper oxide-barium oxide sintering aid combination, about two mole percent each of copper oxide and barium oxide based on the barium titanate are preferred flux additions.

One of the fluxing agent pairs is intimately mixed as fine grain particles with barium titanate. Preferably the barium titanate particles and the fluxing material are about one to five microns in diameter. The powder mixture is milled for a period of hours to obtain a uniform mixture, and the mixture is then calcined to react the fluxing material with the barium titanate. The precise composition and crystal structure of the final product is not known. However, it has been observed that the x-ray diffraction patterns of the fluxed and non-fluxed barium titanate materials are very similar. The Curie temperature of the fluxed titanate is reduced, but other ferroelectric properties are substantially unaltered.

When the fluxed barium titanate is then milled with fine grain size ferrite (again, about one to five microns in particle size), the sintering temperature of the composite material is reduced substantially to a level of about 1100° C. This reduction in sintering temperature enables the use of electrode materials that are much less expensive and increases the overall energy efficiency of the process.

While the invention has been described in terms of a brief summary, other objects and advantages of the invention will become more apparent from a detailed description thereof which follows.

DESCRIPTION OF PREFERRED EMBODIMENTS

Figure 1A:
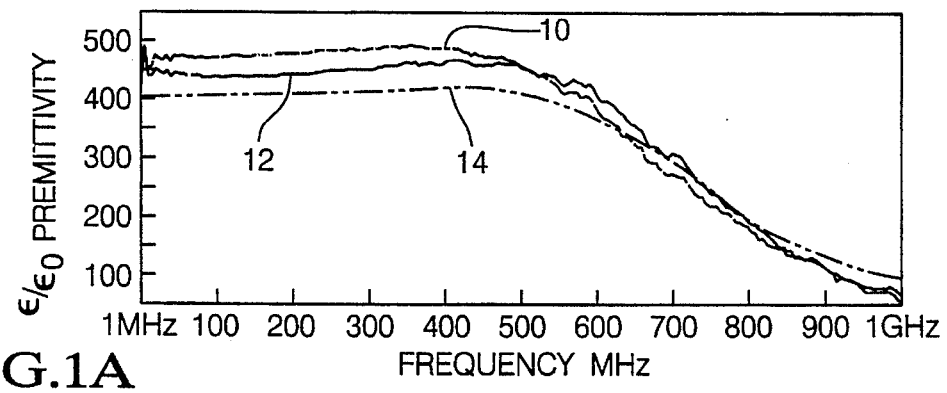
FIG. 1 comprises two graphs of certain electrical properties, permittivity (FIG. 1A) and tan δloss (FIG. 1B) each v. frequency (MHz) of (a) an unfluxed 50% barium titanate-50% ferrite composite, (b) a 50% barium titanate, fluxed with lithium fluoride and barium oxide-50% ferrite composite and (c) a 50% barium titanate, fluxed with barium oxide and copper oxide-50% ferrite composite.

As stated above, the sintering aid combinations of lithium compound and barium oxide or copper oxide and barium oxide have been found to be useful in treating barium and strontium titanates so as to lower the sintering temperature of ferroelectric-ferromagnetic composites containing them without adversely affecting the distinctive properties of the titanate ferroelectrics. The reason that the specified flux pairs are useful has not been established. The composition and crystal structure of the fluxed titanates are not known precisely. However, it is clear that the minor portion of the fluxing agent pair reacts with barium titanate, strontium titanate or barium-strontium titanates to form a composition that exhibits a lower sintering temperature in the composite but which retains its desirable ferroelectric properties.

The practice of the invention will be illustrated with an example.

Lithium Fluoride (LiF) and Barium Oxide (BaO) Flux

The following reagent grade materials were mixed in the proportions indicated: $BaTiO_3$, 97.38% by weight; $BaCO_3$, 1.65% by weight, 2 mole % and LiF, 0.97% by weight, 8 mole %. These materials were in the form of a powder. The powders were mixed by ball milling in a polyethylene-lined mill using stainless steel media in water for a period of six hours. After this milling operation, the material was removed from the mill, spread on trays and dried in an oven and then calcined at 850° C. for 30 minutes. The purpose of the heating in air was to decompose the barium carbonate and lithium fluoride and promote the reaction of barium oxide and lithium by diffusion into the particles of barium titanate.

Following the calcining operation and cooling to ambient, the powder was again ball milled utilizing stainless steel media in water for a period of 20 hours. In general, a milling time of six to 20 hours is considered suitable. Following the milling, the powder was again dried and then sieved through a 60 mesh screen.

At this time, the fluxed barium titanate powder was characterized as follows. The powder had a BET specific surface area of 4.0 $m^2/g$. In general, a specific surface area in the range of 1.50 to 5.0 $m^2/g$ is considered suitable. The material was predominantly of a grain size in the range of one to five microns. The x-ray diffraction pattern of the powder using a Cu Kα target was substantially the same as the pattern of the barium titanate starting material. There were no major changes in peak location or intensity. However, the Curie temperature of the fluxed barium titanate was 80° C. as compared to a Curie temperature of 120° C. for the unfluxed barium titanate starting material. The sintering temperature of the fluxed barium titanate was reduced to 1100° C. from 1350° C. The electrical resistivity was approximately $10^{10}$ ohm-cm, the permittivity was 1200 and tan δ was ≦0.1.

Sintering of Fluxed $BaTiO_3/Cu_{0.2}Mg_{0.4}Zn_{0.5}Fe_2O_4$

A powder mixture consisting of 50% by volume fluxed barium titanate powder and 50% by volume of copper-magnesium-zinc ferrite was ball milled for six hours in a polyethylene-lined mill utilizing water and stainless steel ball media. Equal volumes of the barium titanate, density—6.0 g/cc, and ferrite, density—5.1 g/cc were prepared by weighing. The milling was continued for six hours and the milled powder removed and dried and then sieved with a 40 mesh screen.

The resulting powder had a specific surface area (BET method) of 4.0 m²/g. A suitable specific area has a value in the range of 1.5 to 5 m²/g. The milled and dried powder was then isostatically compacted into a small cylindrical pellet of dimensions 9 mm diameter and 12 mm long at a pressure of 30,000 psi. The compact was fired at a temperature of 1100° C.

The above-described composite had a final density of 97.48% of the theoretical density with essentially no open porosity. It is preferred that the open porosity be maintained as close to zero, preferably less than 0.05% open porosity, to obtain the best EMI attenuation properties. In general, it is preferred that the lithium be added in an amount of about 0.75 to 1.5 weight percent as lithium fluoride based on the weight of the titanate starting material. The barium oxide (or equivalent barium oxide precursor) may be present in the amount from one to three mole percent based on the amount of the titanate starting material.

Electrical and other properties of the compacted composite were measured for comparison with the same properties of a compacted and sintered compact made of unfluxed barium titanate and copper-magnesium-zinc ferrite. The following table summarizes and compares the properties.

TABLE 1

| Material | Sintering Temp, °C. | % Theor. Density | % Open Porosity | % Closed Porosity | Resistivity Ω-cm | Permittivity $\epsilon/\epsilon_0$ @ 1 kHz | Tan δ |
| --- | --- | --- | --- | --- | --- | --- | --- |
| Unfluxed Composite | 1185 | 94.50 | 0 | 5.50 | $1.85 \times 10^{10}$ | 442 | 0.03 |
| LiF—BaO fluxed composite | 1100 | 97.48 | 0 | 2.52 | $6.93 \times 10^{10}$ | 490 | 0.028 |

It is seen that the LiF-BaO fluxed barium titanate containing composite has substantially the same density, open and closed porosity and electrical properties as the unfluxed composite. Significantly, however, the fluxed composite was sintered at a temperature 85° C. below the sintering temperature of the unfluxed composite without any loss in the properties that make the ferroelectric-ferromagnetic composite so useful as an EMI attenuator.

Figure 1B:
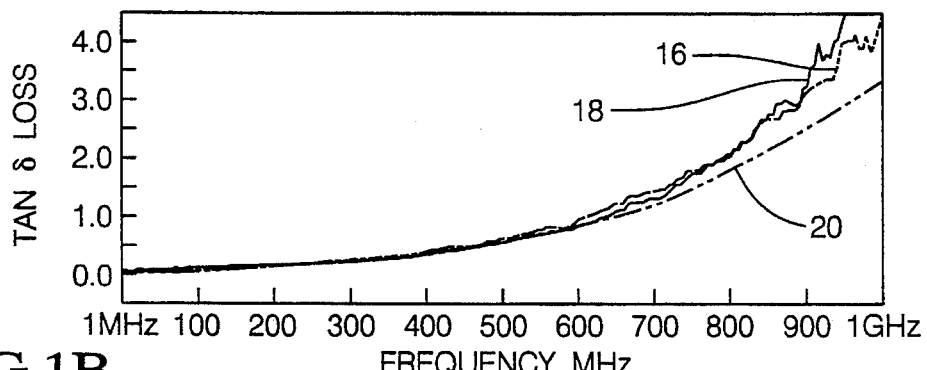
Figure 2A:
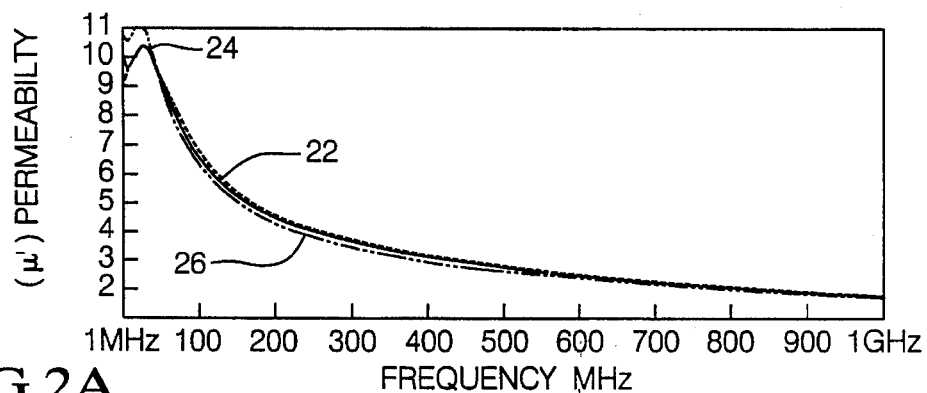
FIG. 2 comprises two graphs of certain magnetic properties, permeability (FIG. 2A) and tan δloss (FIG. 2B), each v. frequency (MHz) of (a) an unfluxed 50% barium titanate-50% ferrite composite, (b) a 50% barium titanate, fluxed with lithium fluoride and barium oxide-50% ferrite composite and (c) a 50% barium titanate, fluxed with barium oxide and copper oxide-50% ferrite composite.
Figure 2B:
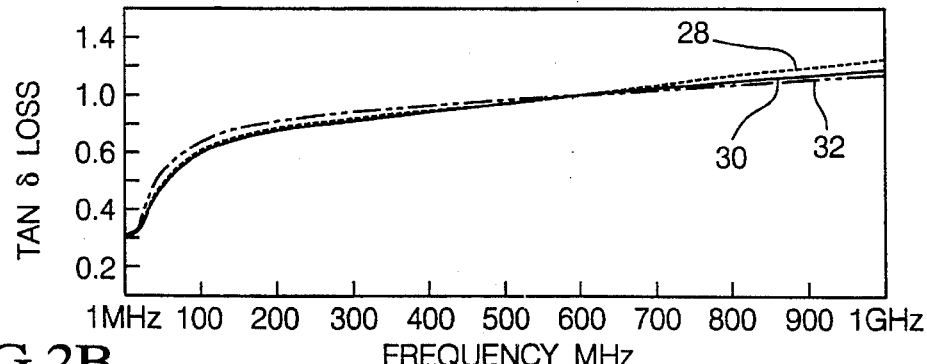

FIGS. 1 and 2 also record and compare the electrical (FIGS. 1A and 1B) and magnetic properties (FIGS. 2A and 2B) over an electromagnetic frequency range from 1 MHz through 1 GHz. In FIG. 1A, the permittivities of the unfluxed composite, curve 10, the lithium fluoride-barium oxide fluxed composite, curve 12, and the copper oxide-barium oxide fluxed composite, curve 14, over that frequency range are plotted. In FIG. 1B, the loss tangents of the unfluxed composite, curve 16, the lithium fluoride-barium oxide fluxed composite, curve 18, and the copper oxide-barium oxide fluxed composite, curve 20, over that frequency range are plotted. Similarly, in FIG. 2A, the permeabilities of the unfluxed composite, curve 22, the lithium fluoride-barium oxide fluxed composite, curve 24, and the copper oxide-barium oxide fluxed composite, curve 26, are plotted. In FIG. 2B, the magnetic loss tangents of the unfluxed composite, curve 28, the lithium fluoride-barium oxide fluxed composite, curve 30, and the copper oxide-barium oxide fluxed composite, curve 32, over that frequency range are plotted. It is seen that all the curves are substantially indistinguishable insofar as the capabilities of the unfluxed and composites for attenuation radio frequency electronic noise is concerned.

Such results are surprising when it is recognized that the selected fluxing additives interact with the barium titanate, and ultimately the ferrite too, lowering the sintering temperature but not the attenuation capabilities of the two independent phases of the sintered composite.

In general, the ferroelectric-ferromagnetic composites may be formulated to contain from 30 to 70 percent by volume ferroelectric with the balance ferromagnetic powder grains. However, for many applications, the best overall properties of electromagnetic interference attenuation is obtained utilizing equal parts by volume 45–55 percent, of each of the ferroelectric and ferromagnetic constituents. The sintering temperature of the composite material depends, of course, on the proportions of the higher melting point and higher sintering constituent. However, it is found that the sintering temperature is lowered from about 1185° C. to 1100° C. for the 50% by volume mixture of the ferroelectric and ferromagnetic constituents using one weight percent lithium fluoride and two mole percent barium oxide as the flux material. Depending upon the proportions of the ferroelectric and ferromagnetic and the amount of flux material, a suitable sintering temperature will typically lie in the range of 1060° C. to 1150° C.

The advantage of reducing the sintering temperature in addition to the energy savings is that metallic electrode materials employed in the preparation of EMI filtering devices are not exposed to such high temperatures. When the barium titanate-copper-magnesium-zinc ferrite composite material is sintered at 1185° C., it is necessary to use a gold-platinum-palladium alloy as the electrode material. This high noble metal content material is very expensive and adds appreciably to the cost of the device. When the sintering temperature is reduced to the order of 1100° C., an electrode material consisting of silver and palladium (70% by weight silver, 30% by weight palladium) may be employed at considerable savings per device.

Use of CuO/BaO Flux Materials

The practice of fluxing barium titanate or other suitable titanates with copper oxide-barium oxide additives is essentially the same as that described above for the lithium compound-barium oxide additives. In general, it is preferred to use approximately equal molar amounts of copper oxide and barium oxide, both at the two molar percent level based on the amount of barium titanate or other suitable ferroelectric starting material. Suitable ranges of copper oxide and barium oxide are in the range of about one mole percent to three mole percent of each, depending upon the proportions of ferroelectric and ferromagnetic in the composite. However, 50—50 mixtures by volume of barium titanate and copper-magnesium-zinc ferrite are suitably sintered at temperatures of the order of 1100° C. when the barium titanate has been previously fluxed with two mole percent each of barium oxide and copper oxide. Again, the fluxed barium titanate contains small amounts of copper oxide and an excess over stoichiometric of the barium oxide, yet its ferroelectric properties are substantially the same as the unfluxed barium titanate, and the x-ray diffraction pattern of the fluxed and unfluxed materials are very similar. Nevertheless, the use of the fluxed barium titanate with any of the suitable $AFe_2O_4$ ferrites produces a sintered composite at a reduced sintering temperature. Composites typically have a final density of the order of 95% of theoretical or higher and, more importantly, essentially no open pore porosity. Suitable ferrites are those where A is copper or copper with one or more of lithium, magnesium, manganese, nickel and/or zinc.

A sample of barium titanate fluxed with two mole percent each of CuO and BaO was prepared by the procedure disclosed above for the LiF-BaO flux. Its sintering temperature is 1100° C. Its X-ray diffraction pattern was virtually indistinguishable from that of unfluxed barium titanate.

This BaO-CuO fluxed titanate was then mixed in equal parts by volume with copper-magnesium-zinc ferrite and a sintered composite prepared by the process disclosed above for the LiF-BaO fluxed titanate and ferrite composite.

Selected properties of this low temperature sintered fluxed composite were measured and summarized in Table 2.

TABLE 2

| Material | Sintering Temp, °C. | % Theor. Density | % Open Porosity | % Closed Porosity | Resistivity Ω-cm | Permittivity $\epsilon/\epsilon_0$ @ 1 kHz | Tan δ |
|---|---|---|---|---|---|---|---|
| Unfluxed Composite | 1185 | 94.50 | 0 | 5.50 | $1.85 \times 10^{10}$ | 442 | 0.03 |
| BaO—CuO fluxed composite | 1110 | 94.89 | 0 | 5.11 | $9.30 \times 10^9$ | 443 | 0.055 |

Again, it is seen that the BaO-CuO fluxed barium titanate containing composite has substantially the same density, open and closed porosity and electrical properties as the unfluxed composite. However, the fluxed composite was sintered at a temperature 75° C. below the sintering temperature of the unfluxed composite without any loss in the properties that make the ferroelectric-ferromagnetic composite so useful as an EMI attenuator. As described above, FIGS. 1 and 2 also record and compare the electrical (FIGS. 1A and 1B) and magnetic (FIGS. 2A and 2B) properties over an electromagnetic frequency range from 1 MHz through 1 GHz. The curves of the unfluxed composite (curves 10, 16, 22 and 28) are substantially indistinguishable from the curves for the copper oxide-barium oxide fluxed composite (curves 14, 20, 26 and 32). Insofar as their capabilities for attenuation of radio frequency electronic noise is concerned, the fluxed and unfluxed are surprisingly equivalent.

In accordance with the invention, the subject process prepares composite ferroelectric-ferromagnetic materials like those described in the above-identified U.S. patent application but at a substantially reduced sintering temperature. Composites of these materials provide dramatic and consistent attenuation of electromagnetic interference over a frequency range from 100 MHz to 1 GHz.

While this invention has been described in terms of certain preferred embodiments thereof, it will be appreciated that other forms could readily be adapted by one skilled in the art. Accordingly, the scope of this invention is to be considered limited only by the following claims.

What is claimed is:

1. A method of making a composite ferroelectric-ferromagnetic material for use as an electromagnetic interference attenuator, where the ferroelectric constituent is one or more ferroelectric materials selected from the group consisting of barium titanate ($BaTiO_3$), strontium titanate ($SrTiO_3$) and barium strontium titanate ($Ba_xSr_{1-x}TiO_3$) and said ferromagnetic constituent is an $AFe_2O_4$ ferrite where A is copper or copper with one or more of lithium, magnesium, manganese, nickel and zinc, comprising:

mixing a said ferroelectric material having a grain size in the range of about one to five microns with at least two fluxing constituents of like grain size and selected from the group consisting of lithium compounds and the oxides or oxide precursor compounds of barium and copper, calcining said ferroelectric and fluxing material mixture, comminuting the calcined mixture to provide fluxed ferroelectric particles having a specific surface area of about 1.5 to 5.0 $m^2/g$, mixing said fluxed ferroelectric particles with particles of a ferromagnetic material having a grain size in the range of about one to five microns in the proportions of 30 to 70 percent by volume ferroelectric and the balance ferromagnetic, and sintering the mixture at a temperature in the range of 1060° C. to 1150° C. to form a said ferroelectric-ferromagnetic composite consisting essentially of a first phase of grains of said ferroelectric interconnected with a second phase of grains of ferromagnetic, such that said ferroelectric and ferromagnetic phases retain their respective distinct electromagnetic properties.

2. A method as recited in claim 1 in which the ferroelectric is at least predominantly barium titanate, A consists essentially of copper, magnesium and zinc, and the sintering temperature is in the range of 1060° C. to 1110° C.

3. A method as recited in claim 1 in which the mixture to be sintered consists essentially of 45 to 55 percent by volume of said ferroelectric constituent and the balance a said ferromagnetic constituent.

4. A method as recited in any of claims 1 through 3 in which the closed pore porosity of sintered ferroelectric-ferromagnetic composite is less than one percent.

5. A method as recited in any of claims 1 through 4 in which the fluxing constituents consist essentially of a lithium compound selected from the group consisting of lithium carbonate, lithium fluoride and lithium chloride and a barium compound selected from the group consisting of barium oxide and thermally decomposable precursors of barium oxide.

6. A method as recited in any of claims 1 through 4 in which the fluxing constituents consist essentially of a barium compound selected from the group consisting of barium oxide and thermally decomposable precursors of barium oxide and a copper compound selected from the group consisting of copper oxide and thermally decomposable precursors of copper oxide.

* * * * *